United States Patent
Lenzo et al.

(10) Patent No.: US 6,587,444 B1
(45) Date of Patent: Jul. 1, 2003

(54) FIXED FREQUENCY-TIME DIVISION DUPLEX IN RADIO COMMUNICATIONS SYSTEMS

(75) Inventors: Michael Lenzo, Apex, NC (US); Qun Shen, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/189,807

(22) Filed: Nov. 12, 1998

Related U.S. Application Data

(60) Provisional application No. 60/065,797, filed on Nov. 14, 1997, and provisional application No. 60/065,799, filed on Nov. 14, 1997.

(51) Int. Cl.[7] .............................. H04B 1/56; H04L 5/14; H04J 4/00
(52) U.S. Cl. ...................... 370/330; 370/276; 370/280; 370/328; 370/478
(58) Field of Search ............................... 370/328, 330, 370/336, 337, 344, 345, 347, 377, 276–277, 280, 281, 294, 295, 436, 478; 445/447, 450, 62

(56) References Cited

U.S. PATENT DOCUMENTS

| | | | |
|---|---|---|---|
| 5,134,710 A | | 7/1992 | Åkerberg ..................... 455/464 |
| 5,307,507 A | | 4/1994 | Kanai .......................... 455/447 |
| 5,444,696 A | | 8/1995 | Petranovich ................. 370/337 |
| 5,475,677 A | * | 12/1995 | Arnold et al. ............... 370/280 |
| 5,581,548 A | | 12/1996 | Ugland et al. ............... 370/330 |
| 5,594,720 A | | 1/1997 | Papadopoulos et al. ..... 370/330 |
| 5,602,836 A | | 2/1997 | Papadopoulos et al. ..... 370/280 |
| 5,617,412 A | | 4/1997 | Delprat et al. ............... 370/281 |
| 5,649,292 A | | 7/1997 | Doner .......................... 455/447 |
| 5,689,502 A | * | 11/1997 | Scott ............................ 370/281 |
| 5,732,076 A | * | 3/1998 | Ketseoglou et al. ........ 370/347 |
| 5,920,819 A | * | 7/1999 | Asanuma ..................... 455/447 |
| 5,956,326 A | * | 9/1999 | Magana ....................... 370/277 |
| 6,047,015 A | * | 4/2000 | Watanabe et al. ........... 375/132 |
| 6,049,716 A | | 4/2000 | Jung ............................ 455/442 |
| 6,094,421 A | | 7/2000 | Scott ............................ 370/280 |
| 6,134,227 A | * | 10/2000 | Magana ....................... 370/330 |
| 6,151,512 A | | 11/2000 | Chheda et al. .............. 455/562 |
| 6,154,661 A | | 11/2000 | Goldburg .................... 455/562 |
| 6,240,076 B1 | * | 5/2001 | Kanerva et al. ............. 370/330 |

FOREIGN PATENT DOCUMENTS

| | | | |
|---|---|---|---|
| EP | 0720405 | | 7/1996 |
| GB | 2306083 | * | 4/1997 |
| JP | 0899972 | * | 9/1999 |
| WO | WO97/21287 | | 6/1997 |
| WO | WO9723071 | | 6/1997 |
| WO | WO98/49791 | | 11/1998 |

* cited by examiner

*Primary Examiner*—Hassan Kizou
*Assistant Examiner*—Saba Tsegaye
(74) *Attorney, Agent, or Firm*—Myers Bigel Sibley & Sajovec

(57) ABSTRACT

A flexible channel architecture supports full-duplex, radio-frequency communication between a base station, such as a PWT or DECT base station, and a group of remote terminals. Communication from the base to the terminals is by way of a radio-frequency carrier having a first frequency, and communication from the terminals to the base is by way of a second radio-frequency carrier having a second frequency. Each carrier is organized to provide an N-timeslot time-division multiple access data stream (N an integer), so that together the two carriers provide a 2N-timeslot system. Within each data frame, data from the base to the terminals is sent on the first carrier during a first half of the frame, and data from the terminals to the base is sent on the second carrier during the remaining half of the frame. An additional, complimentary base station, constructed to transmit when the first base station is receiving and vice versa, can be co-located with the first base station to provide full time and spectral efficiency within a coverage area serviced by the base stations.

19 Claims, 5 Drawing Sheets

FIXED FREQUENCY-TIME DIVISION DUPLEX IN RADIO COMMUNICATIONS SYSTEMS

CROSS REFERENCE TO RELATED APPLICATIONS

The present application claims the benefit of U.S. Provisional Application No. 60/065,797, filed Nov. 14, 1997, and U.S. Provisional Application No. 60/065,799, also filed Nov. 14, 1997, each of which is incorporated herein in its entirety by reference.

FIELD OF THE INVENTION

The present invention relates to radio communications systems, and more particularly to duplex schemes in time-division multiple-access (TDMA) systems.

BACKGROUND OF THE INVENTION

Most time-division multiple-access wireless communications systems employ either a time-division duplex (TDD) scheme or a frequency-division duplex (FDD) scheme to separate uplink and downlink transmissions. Since both duplex schemes provide certain advantages and disadvantages, both schemes are routinely utilized in wireless communications applications.

For example, in the Personal Wireless Telecommunication (PWT) standard, time-division multiple-access with time-division duplex is used for frequency planning as well as signal packet and time slot assignment. Such a time-division multiple-access/time-division duplex scheme is well suited for many business wireless communication applications (e.g., small-campus systems with micro or pico cells).

On the other hand, time-division multiple-access with either time-division duplex or frequency-division duplex can be preferable for licensed Personal Communication Service (PCS) frequency bands, depending upon customer demands and marketplace requirements. In other words, since the structure of a Personal Communications Service system is primarily determined by a service provider having acquired a portion of the frequency spectrum, the technology and frequency usage implemented in such a system is ultimately driven by customer demand as well as legal and practical constraints. While a first customer may request a time-division multiple access/time-division duplex system for a particular business wireless application, a second customer may thereafter demand a time-division multiple access/frequency-division duplex system for a wireless local loop application.

Thus, product and service providers are often required to convert between duplex schemes. Converting between schemes, however, typically results in duplicated effort and therefore wastes significant time and resources. For example, since the conventional time-division duplex and frequency-division duplex schemes are fundamentally different, it generally is not feasible to use a common hardware platform for both types of system. As a result, two development teams are typically assigned, and two separate product lines are usually established, to provide for both time-division duplex and frequency-division duplex implementations.

Thus, there is a need for a flexible duplex scheme which will allow a communications system to be adapted to satisfy varying customer needs without requiring modification of basic system hardware architecture.

SUMMARY OF THE INVENTION

The present invention fulfills the above-described and other needs by providing a flexible division duplex mechanism in a time-division multiple-access communications system. More specifically, the disclosed system utilizes a mixed, or hybrid, division duplex mechanism such that uplink and downlink transmissions are separated in frequency while time slots associated with transmission and reception are also separated in time. The hybrid duplex scheme, referred to herein as frequency-time division duplex (FTDD), allows alternative division duplex mechanisms to be selectively implemented within a communications system without requiring modification of the basic system hardware architecture.

Advantageously, the disclosed system can utilize a single hardware platform for applications where either time-division duplex or frequency-division duplex is preferred. According to exemplary embodiments, the disclosed system is neither a pure time-division duplex system, in which the same frequency band is used for both uplink and downlink transmissions, nor a pure frequency-division duplex system in which both uplink and downlink transmissions occur simultaneously. Rather, the disclosed system utilizes separate frequency bands as well as separate time slots for uplink and downlink communications. Thus, a hardware platform initially designed for use in a time-division multiple access/time-division duplex system can be readily adapted for use in a time-division multiple access/frequency-division duplex system, and vice versa, without significant hardware modification. This feature of the present invention results in lower non-recurring engineering costs and shorter system development time.

Furthermore, since uplink and downlink communications are separated in both frequency and time, the disclosed system provides less cross-channel interference as compared to prior art systems. Also, since a single hardware path can be used for both uplink and downlink transmissions at both base stations and terminals, embodiments of the present invention retain the advantages of low cost and power consumption typically associated with conventional time-division duplex systems. The present invention also provides methods and apparatus which enable a frequency-time division system to operate without loss of spectral efficiency.

According to an exemplary embodiment, a wireless communications system includes a plurality of mobile stations and a base station. The base station is configured to transmit downlink communications signals to the mobile stations via a first carrier frequency and to receive uplink communications signals from the mobile stations via a second carrier frequency, the downlink and uplink communications signals being transmitted and received via successive time division multiple access frames, each frame including a plurality of time slots. For each active communications link (e.g., for each call) established between the base station and a mobile station, a first time slot within each frame is allocated for downlink communications and a second time slot within each frame is allocated for uplink communications, the first and second allocated time slots being separated in time by a fixed time offset. According to the embodiment, a first partition of the time slots within each frame is reserved for downlink communications from the base station to the mobile stations and a second partition of the time slots within each frame is reserved for uplink communications from the mobile stations to the base station.

The communications system can also include an additional base station co-located with the first base station and similarly configured to transmit downlink communications signals to the mobile stations via the first carrier frequency and to receive uplink communications signals from said mobile stations via the second carrier frequency, the downlink and uplink communications signals of each of said additional base stations being transmitted and received via successive time division multiple access frames, each frame including a plurality of time slots. For each active communications link established between the additional base station and a mobile station, a first time slot within each frame of the additional base station is allocated for downlink communications from the additional base station and a second time slot within each frame of the additional base station is allocated for uplink communications to the additional base station, the first and second allocated time slots being separated in time by a fixed time offset. A first partition of the time slots within each frame of the additional base station is reserved for uplink communications and a second partition of the time slots within each frame of the additional base station is reserved for downlink communications. To provide full time and spectral efficiency for the coverage area serviced by the two co-located base stations, the first and second partitions of the frames of each of the base stations are structured such that, for each time slot in each frame, only one of the base stations is permitted to transmit on the first carrier frequency and only one of the base stations is permitted to receive on the second carrier frequency.

The above described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1:
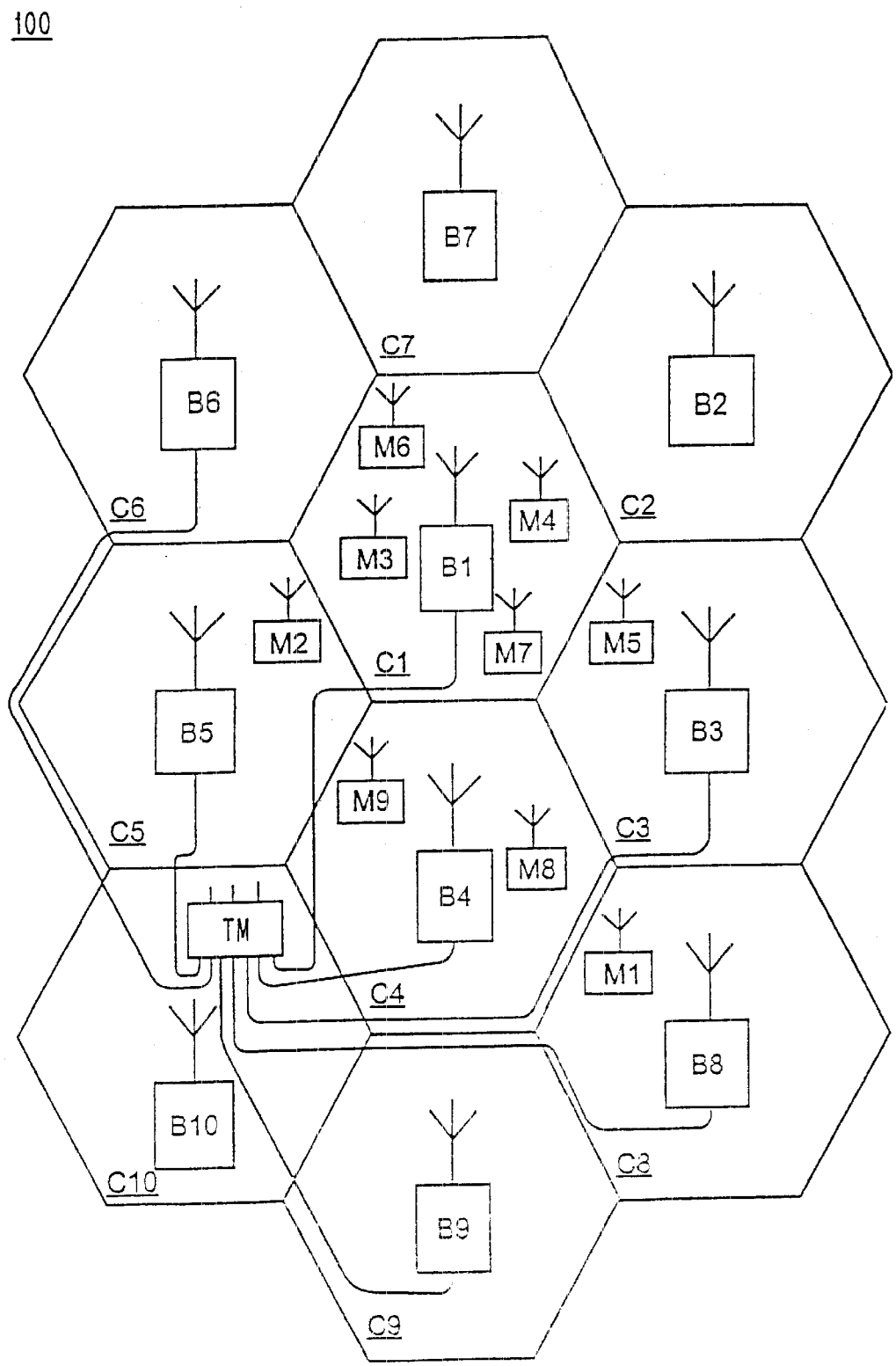
FIG. 1 depicts an exemplary wireless communications system in which the teachings of the invention can be implemented.

FIG. 1 depicts a wireless communications system 100 in which the teachings of the present invention can be implemented. As shown, the exemplary wireless system includes ten cells or coverage areas C1–C10, ten base stations B1–B10, a timing master TM and ten mobile stations M1–M10. Such a wireless system can be constructed, for example, in accordance with the Personal Wireless Telecommunication (PWT) standard, and can therefore be used, for example, to provide mobile communications within a building or throughout a campus including many buildings and open areas. Generally, a wireless system can include far more than ten cells, ten base stations and ten mobile stations; however, ten of each is sufficient for illustrative purposes.

As shown, one or more base stations can be situated in each of the cells. Although FIG. 1 shows the base stations located toward the cell centers, each base station can instead be located anywhere within a cell. Base stations located toward a cell center typically employ omni-directional antennas, while base stations located toward a cell boundary typically employ directional antennas. The timing master TM, or radio exchange, maintains timing synchronization between the base stations as is known in the art. The timing master can be connected to the base stations by cable, radio links, or both.

Each base station and each mobile station includes a transceiver for transmitting and receiving communications signals over the air interface. Typically, the base and mobile stations communicate using a form of time, frequency or code division multiple access (i.e., TDMA, FDMA or CDMA) as is known in the art. As the mobile stations move within a cell and from cell to cell, communication with at least one base station is always possible. As a result, mobile station users are able to place, receive and conduct calls anywhere within the overall system coverage area.

To illuminate the features and advantages of the hybrid, frequency-time division duplex (FTDD) scheme of the present invention, conventional time-division duplex (TDD) and frequency-division duplex (FDD) schemes are described hereafter with respect to FIGS. 2A, 2B, 3A and 3B. Without loss of generality, the channel definition in the Personal Wireless Telecommunication standard is used to illustrate a conventional time-division multiple-access (TDMA)/TDD system. Although channel definitions can differ between standards, the underlying multiplexing and duplexing concepts remain the same.

Figure 2A:
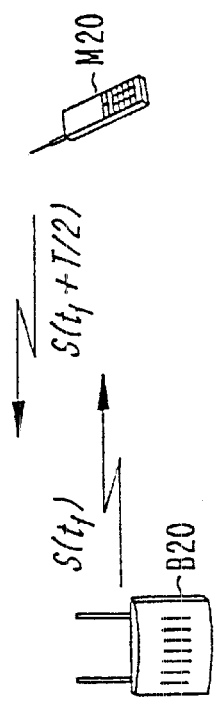
FIG. 2A depicts a base station and a terminal communicating in accordance with a conventional time-division multiple-access/time-division duplex scheme.
Figure 2B:
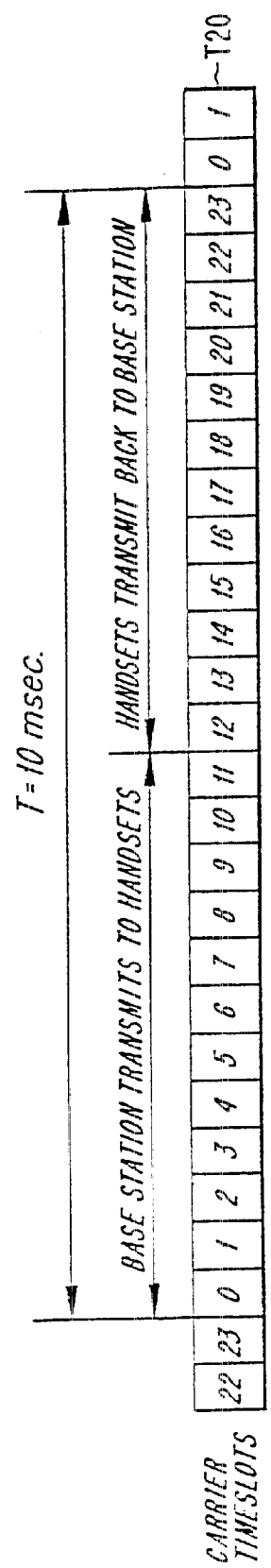
FIG. 2B depicts an exemplary time slot arrangement in a conventional time-division multiple-access/time-division duplex system.

FIG. 2A depicts uplink and downlink communication according to a conventional TDD scheme. As shown, signals transmitted from a TDD base station B20 to a TDD handset M20, and those transmitted from the TDD handset M20 to the TDD base station B20, are separated in time. If, as shown in FIG. 2B, a predetermined time interval T represents the duration of a single TDMA/TDD frame T20, then the separation between uplink and downlink transmissions is typically one half of the predetermined time interval T, or T/2. In a Personal Wireless Telecommunications system, each frame is 10 milliseconds in duration and includes twenty-four data slots. Within a data frame, twelve time slots are used for transmission (from the TDD base station B20 to the TDD handset M20), and the remaining twelve time slots are used for reception (i.e., transmission from the TDD handset M20 to the TDD base station B20). Though transmissions and receptions are separated by certain fixed (or variable) time, they share a common frequency band. The channel of such a system is therefore defined by a predetermined frequency and time reference pair.

Such TDMA/TDD systems are widely adopted in various wireless communications applications. An advantage of these systems is that of frequency efficiency, as both uplink and downlink transmissions use a common frequency carrier. Additionally, since transmissions and receptions are separated in time, a single hardware path (including filters, local oscillators, etc.) can be used for both functions. As a result, TDD systems are relatively low cost. Also, since receiving hardware can be turned off during transmission (and transmitting hardware can be turned off during reception), TDD systems consume relatively little power.

Figure 3A:
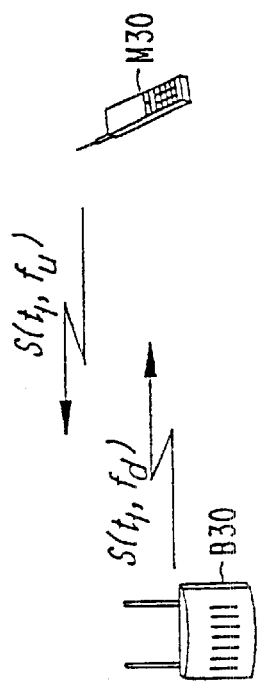
FIG. 3A depicts a base station and a terminal communicating in accordance with a conventional time-division multiple-access/frequency-division duplex scheme.
Figure 3B:
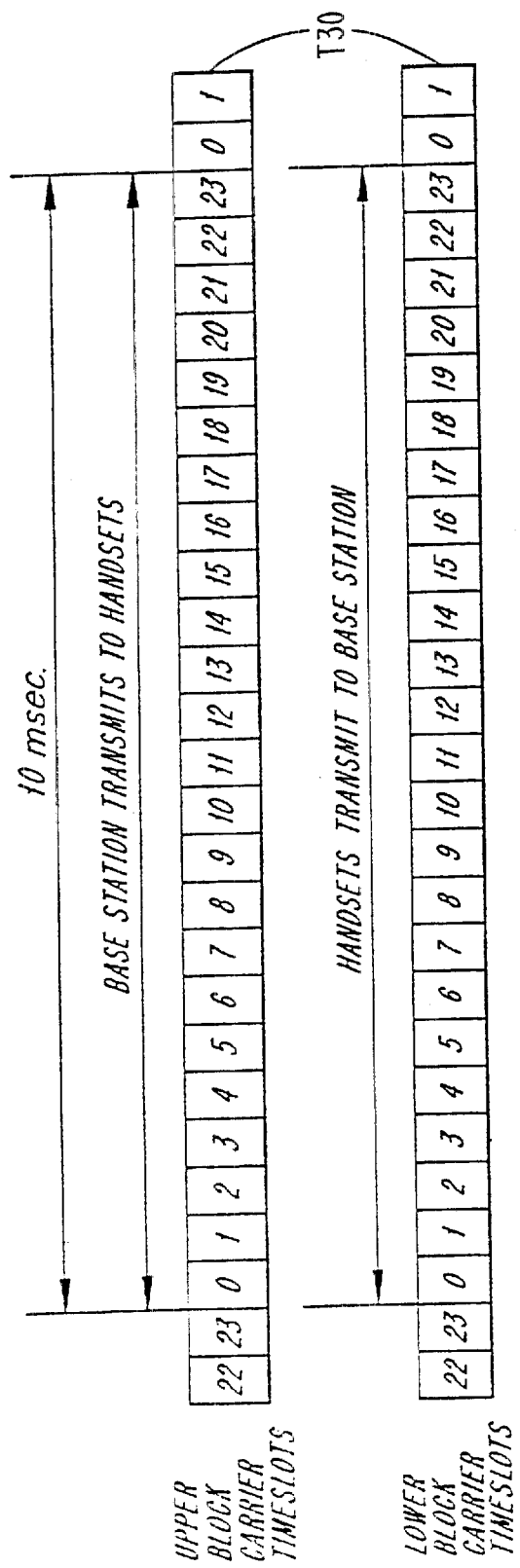
FIG. 3B depicts an exemplary time slot arrangement in a conventional time-division multiple-access/frequency-division duplex system.

By way of contrast, frequency-division duplex (FDD) systems require separate frequency bands for uplink and downlink communications. This results from the fact that the receive and transmit operations are executed simultaneously in time at different frequencies. A channel in a FDD system is thus defined by the frequency of operation. FIG. 3A depicts uplink and downlink communications between a conventional FDD base station B30 and a conventional FDD handset M30, and FIG. 3B shows an exemplary TDMA/FDD frame T30. Since both transmit and receive are accomplished simultaneously, separate hardware paths are required in both base stations and terminals. As a result, FDD systems are typically higher cost and consume more power as compared to conventional TDD systems. However, FDD systems provide relatively little cross-channel interference and are sometimes preferred from an inter-system perspective. In other words, a FDD scheme may be required to make a system compatible with proximate systems using an adjacent portion of the frequency spectrum. As a result, FDD systems have also been widely adopted in wireless communications applications.

Though both TDD and FDD systems do provide certain advantages, neither is ideally suited for all wireless communications applications. Further, as described above, the fundamental differences between TDD and FDD make it difficult to adapt a system configured specifically for one or the other to conform with a particular application need. Advantageously, the present invention provides a hybrid, frequency-time division duplex (FTDD) scheme which provides certain of the advantages of both types of conventional system and which further allows a single hardware configuration to be readily adapted to suit virtually any wireless communications application.

Figure 4A:
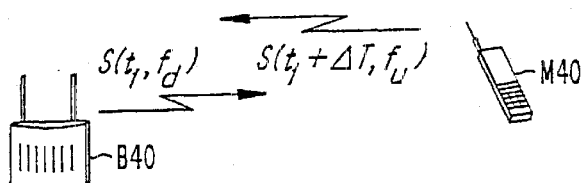
FIG. 4A depicts a base station and a terminal communicating in accordance with a time-division multiple-access/frequency-time division duplex scheme taught by the present invention.

FIG. 4A depicts a FTDD base station B40 and a FTDD handset M40 communicating according to the TDMA/FTDD scheme of the present invention. As shown, signals transmitted from the FTDD base station B40 to the FTDD handset M40, and those transmitted from the FTDD handset M40 to the FTDD base station B40, are separated in both time and frequency.

A general channel definition for such a TDMA/FTDD scheme is described in co-pending U.S. patent application Ser. No. 09/189,808, it is now abandoned, entitled "Flexible Frequency-Time Division Duplex in Radio Communicaitons Systems" and filed on even date herewith, which is incorporated herein in its entirety by reference. While the general channel definition provides a great degree of flexibility, the present invention teaches that certain advantages in terms of reduced hardware complexity and reduced software overhead can be achieved by giving up some flexibility. Specifically, the present invention teaches that certain advantages can be derived by partitioning a TDMA/FTDD frame and reserving certain time slots for either uplink or downlink transmission.

Figure 4B:
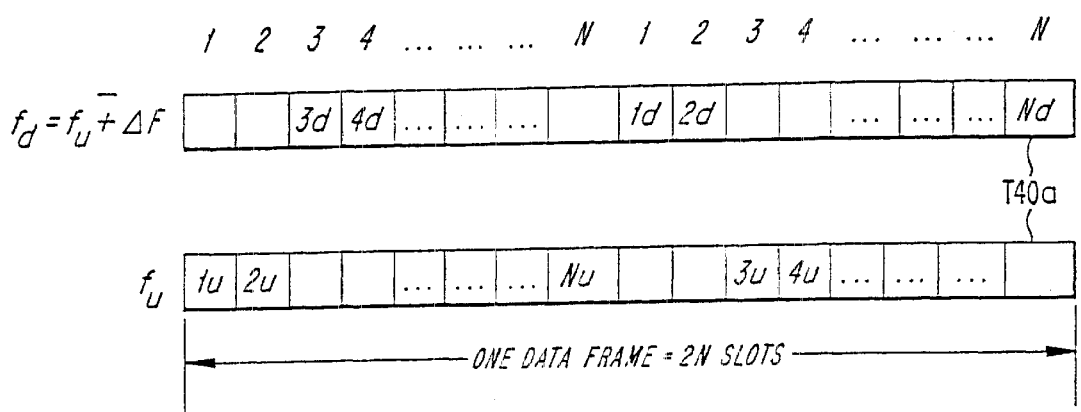
FIG. 4B depicts an exemplary time slot arrangement in a time-division multiple-access/frequency-time division duplex system according to the invention.
Figure 4C:
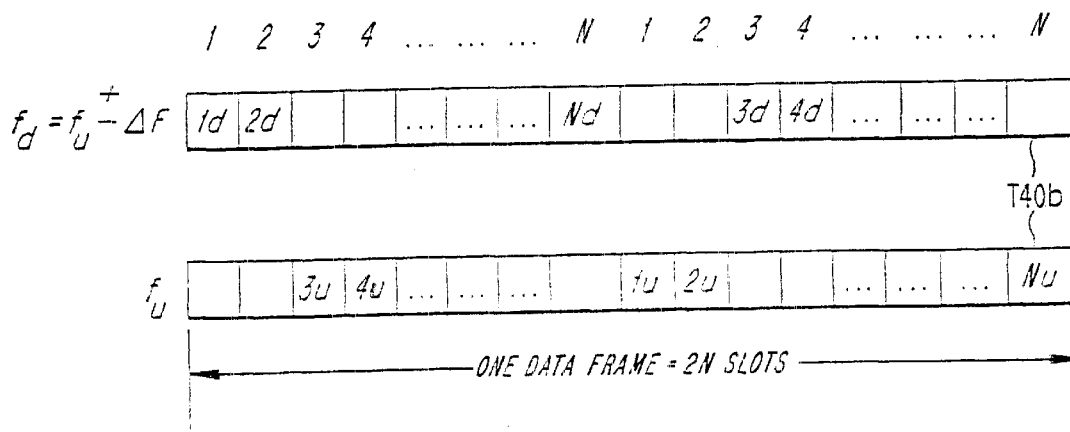
FIG. 4C depicts an alternative and complimentary time slot arrangement in a time-division multiple access/frequency-time division duplex system according to the invention.

Two exemplary channel definitions T40a, T40b according to the scheme of the present invention are depicted in FIGS. 4B and 4C, respectively. Without loss of generality, a data frame for the channel definitions of FIGS. 4B and 4C is defined to include 2N time slots (N an integer). One half of the slots (i.e., a first N slots) are reserved for transmission from a base station to a portable, and the remaining half of the slots (i.e., a second N slots) are reserved for transmission from a portable to a base station. Assuming that the time durations of downlink and uplink slots are given by d and u, respectively, then the duration T of a single frame in the frequency-time division duplex scheme is given by T=N(d+u).

According to the channel definition T40a of FIG. 4B, an upper frequency band is reserved for base station to handset transmission, and a lower frequency is reserved for handset to base station transmission. Thus, the first N time slots in a frame are dedicated for downlink communication, and the second N time slots are dedicated for uplink communication. Conversely, according to the alternative and complimentary channel definition of FIG. 4C, the second N time slots are reserved for downlink communication, and the first N time slots are reserved for uplink communication. For the case in which the transmit and receive time slots are of the same duration (i.e., d=u), one half of the frame T, or T/2, is reserved for downlink signals and the remaining half is reserved for uplink signals. By co-locating a first base station operating in accordance with the channel definition of FIG. 4B with a second base station operating in accordance with the channel definition of FIG. 4C, complete time and spectral efficiency can be provided for a particular coverage area. In other words, both frequencies in each TDMA time slot can be used for uplink or downlink transmission.

To ensure that an overall system constructed according to the invention operates properly, timing alignment among base stations is maintained. Specifically, individual base stations are time shifted with respect to a base reference. For example, a first group of base stations can employ zero offset so that they operate according to the channel definition of FIG. 4B, and another group of base stations can employ a half-frame offset (i.e., T/2) so that they operate according to the channel definition of FIG. 4C. Thus, uplink and downlink transmissions for the second group of base stations are offset by T/2 with respect to those of base stations in the first group. By combining one or more base stations from each group at common locations (e.g., in each cell in a wireless coverage area), a system according to the invention can achieve efficiency in frequency and time while maintaining full capacity for individual base stations.

Figure 5:
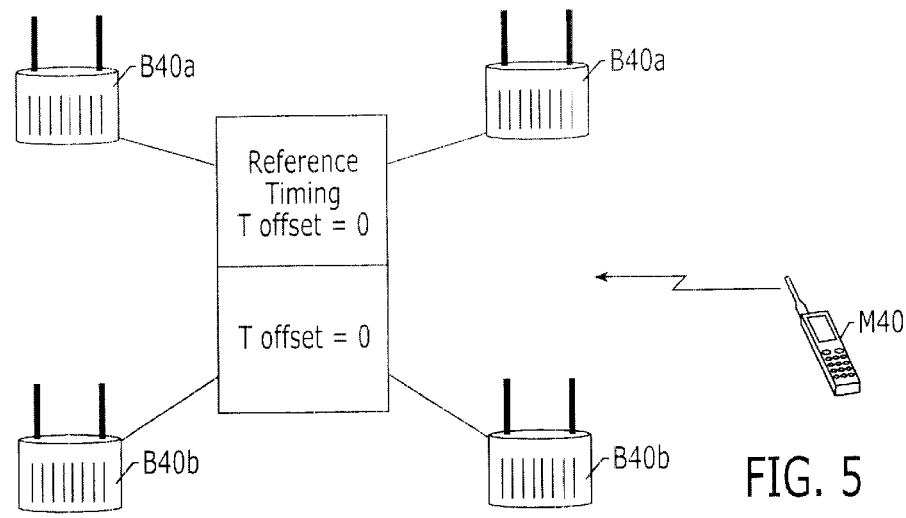
FIG. 5 depicts reference timing among two groups of base stations in an exemplary time-division multiple-access/frequency-time division duplex system according to the invention.

The above described timing relationship between base stations is depicted in FIG. 5. As shown, two starting moment reference clocks are offset by T/2. A first group of base stations B40a are connected to the base reference clock (zero offset), while a second group of base stations B40b are connected to the offset reference (T/2 offset). An additional offset is maintained at the network level to keep individual calls aligned. Thus, during FTDD operation (i.e., when separate uplink and downlink frequencies are used), the first group of base stations B40a operates in accordance with the channel definition of FIG. 4B, while the second group of base stations B40b operates in accordance with the channel definition of FIG. 4C.

Note that using a half-frame reference offset maintains slot synchronization between base stations, making synchronized communication with handsets possible for both groups of base stations. The resulting system thus maintains the capacity of individual base stations when operating in a time-division duplex mode, while allowing co-located base stations to recover full spectral and time efficiency when operating in a frequency-time division duplex mode.

Thus, with appropriate base station synchronization, it is possible for a handset to conduct communication with any base station in an overall system. Specifically, handsets need only adhere to the rule that time slots are paired with half-frame separation between uplink and downlink transmissions while independently maintaining simultaneous communications to both base station types. Thus, seamless handovers can be achieved between all base stations in an overall system. Those skilled in the art will appreciate that the above described timing can be achieved via straightforward software modification of existing systems.

Those skilled in the art will also appreciate that a system employing two groups of base stations with half-frame offset between groups is just one exemplary embodiment of the present invention. Generally, any number of base station groups can be used with appropriate fixed time-slot offsets between groups. For example, four groups of base stations can be implemented using quarter-frame offsets between groups. In such case, each group reserves one quarter of the time slots in each TDMA frame for uplink transmission and another one quarter of the time slots in each TDMA frame for downlink transmission. The frames are reserved for each group so that, at any moment in time, at most one group of base stations can transmit on the downlink frequency and at most one group of base stations can receive on the uplink frequency. Thus, four co-located base stations, one from each of the four groups, can provide full time and spectral efficiency for a particular coverage area.

Note that the time slots reserved for uplink and downlink transmission for a particular type of base station need not be consecutive time slots within a TDMA frame. For example, in a two-group system such as that depicted in FIGS. 4B, 4C and 5, the first group of base stations can reserve even numbered time slots for downlink communication and odd numbered time slots for uplink communication, while the second complimentary group of base stations reserves odd numbered time slots for downlink communication and even numbered time slots for uplink communications. Those skilled in the art will immediately appreciate that every possible combination of complimentary time slot arrangement is contemplated herein. It is only important that, once a particular partition of time slots is reserved for uplink or downlink transmission by one group of base stations, the time slots in that particular partition cannot be also be used for the same type of transmission by another group of base stations. Indeed, the time slots reserved for uplink and downlink transmission for each base station group can be randomly distributed throughout the TDMA frames.

As noted above, since uplink and downlink transmissions occur at separate times, a system utilizing the FTDD scheme of the present invention can be constructed so that the transmit and receive paths in both a base station and a terminal are shared as in a conventional time-division duplex system. As a result, a system constructed according to the invention provides the advantages of relatively low cost and low power consumption. This aspect of the invention is depicted in FIG. 6.

Figure 6:
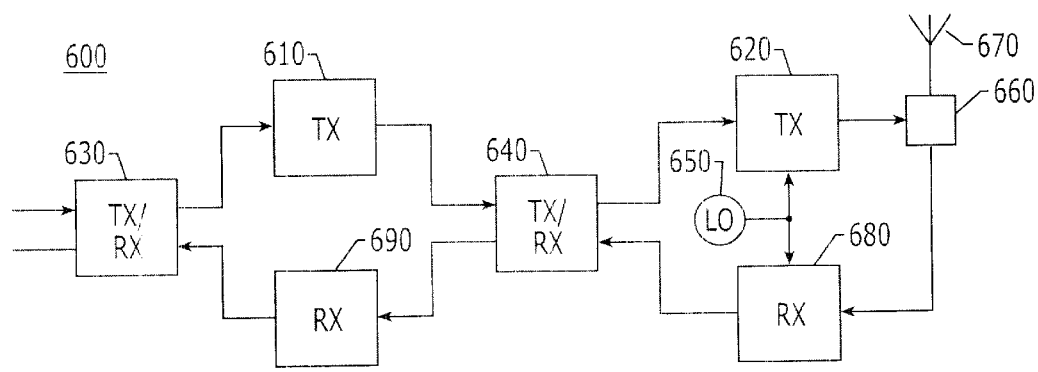
FIG. 6 depicts an exemplary base station transceiver constructed in accordance with the present invention.

In FIG. 6, an exemplary base station transceiver 600 includes a transmit signal processing path and a receive signal processing path. As shown, the transmit processing path includes first and second transmit blocks 610, 620, first and second transmit/receive blocks 630, 640, a local oscillator 650, a duplexor 660 and an antenna 670. Additionally, the receive signal processing path includes the local oscillator 650, the duplexor 660 and the antenna 670, as well as first and second receive blocks 680, 690.

The first transmit block 610 can include, for example, a conventional upconverter, and the second transmit block 620 can include, for example, power amplifiers and mixers. Additionally, the first receive block 680 can include, for example, low noise amplifiers (LNAs) and mixers, and the second receive block 690 can include, for example, a conventional downcoverter and limiter. The first transmit/receive block 630 can include, for example, a modem, and the second transmit/receive block 640 can include, for example, bandpass filters. The duplexor 660 can be, for example, a two-way filter or a switch.

During downlink transmission, the duplexor 660 couples the antenna 670 to the second transmit block 620 and isolates the antenna 670 from the first receive block 680. Baseband transmit signals are processed by the first transmit/receive block 630 and are then upconverted, filtered and amplified in blocks 610, 640, 620, respectively, prior to transmission via the antenna 670. Conversely, during uplink reception, the duplexor 660 couples the antenna 670 to the first receive block 680 and isolates the antenna 670 from the second transmit block 620. Radio frequency signals are received at the antenna 670 and then amplified, filtered and downconverted in blocks 680, 640 and 690, respectively, prior to being processed by the first transmit/receive block 630. Because the transmit and receive processing paths share certain components (i.e., those components in the first and second transmit/receive blocks 630, 640, which are typically very expensive), a base station transceiver constructed in accordance with the invention can be made smaller and less costly as compared to conventional TDMA/FDD transceivers.

Though the disclosed frequency-time division duplex scheme is not a true frequency-division duplex system, in that transmission and reception are not conducted simultaneously, the frequency-time division duplex scheme nonetheless appears to proximate systems as a frequency-division duplex scheme from the perspective of intersystem interference. Thus, a system utilizing the frequency-time division duplex scheme can be implemented in contexts where a frequency-division duplex scheme is preferred. Furthermore, hardware configured to implement the frequency-time division scheme can also be utilized where time-division duplex is preferred. In other words, a simple software change can be used to shift one or both of the uplink and downlink frequencies (i.e., by changing the frequencies of the local oscillators used to generate the corresponding carriers) so that the uplink and downlink frequencies are the same and the system operates as a true time-division duplex system.

Thus, a time-division multiple-access system constructed according to the present invention can be easily configured to use either a time-division duplex scheme or a pseudo frequency-division duplex scheme. Furthermore, a system originally configured to use time-division duplex can be easily converted to use frequency-division duplex, and vice versa, as needs change. Advantageously, such conversions can be accomplished quickly and inexpensively without architecture modification.

In sum, the present invention provides a time-division multiple access system with a flexible frequency-time division duplex mechanism. According to the invention, existing time-division multiple access/time-division duplex hardware can be utilized for applications where frequency-division duplex is preferred or required. The disclosed system allows either a common frequency band or dual frequency bands to be used for uplink and downlink communications. Advantageously, time-division duplex capability is maintained, as are the benefits of low hardware cost and low power consumption. A system can be repeatedly converted for both time-division duplex and frequency-division duplex without requiring significant hardware modification.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

We claim:

1. A base station for use in a wireless communications system including a plurality of mobile stations, said base station comprising:

a transceiver configured to transmit downlink communications signals to said mobile stations via a first carrier frequency and to receive uplink communications signals from said mobile stations via a second carrier frequency, the downlink and uplink communications signals being transmitted and received via successive time division multiple access frames, each frame including a plurality of time slots in each of the first carrier frequency and the second carrier frequency, wherein, for each active communications link between said base station and a particular mobile station, a first time slot in each frame is allocated for downlink communication to the particular mobile station and a second time slot in each frame is allocated for uplink communication from the particular mobile station, the first and second allocated time slots being separated in time by a fixed time offset, and wherein a first partition of the time slots within each frame is reserved for downlink communications from said base station to the mobile stations and a second partition of the time slots within each frame is reserved for uplink communications from the mobile stations to said base station, such that a first portion of the time slots within each frame are reserved for downlink communications and a second portion of the time slots within each frame are reserved for uplink communications.

2. A base station according to claim 1, wherein a duration of the fixed time offset is the same for each active communications link.

3. A base station according to claim 2, wherein each frame is of a duration T and includes a number, 2N, of time slots, each time slot being of a duration T/2N, and wherein the duration of the fixed time offset for each active communications link is T/2.

4. A base station according to claim 1, wherein a downlink signal processing path and an uplink signal processing path of said transceiver share common signal processing components.

5. A base station according to claim 4, wherein said shared signal processing components include at least one of a filter, a local oscillator and a modem.

6. A wireless communications system, comprising:

a plurality of mobile stations; and a first base station configured to transmit downlink communications signals to said mobile stations via a first carrier frequency and to receive uplink communications signals from said mobile stations via a second carrier frequency, the downlink and uplink communications signals being transmitted and received via successive time division multiple access frames, each frame including a plurality of time slots in each of the first carrier frequency and the second carrier frequency, wherein, for each active communications link between said first base station and a mobile station, a first time slot in each frame is allocated for downlink communications and a second time slot in each frame is allocated for uplink communications, the first and second allocated time slots being separated in time by a fixed time offset, and wherein a first partition of the time slots within each frame is reserved for downlink communications from said first base station to the mobile stations and a second partition of the time slots within each frame is reserved for uplink communications from the mobile stations to said first base station, such that a first portion of the time slots within each frame are reserved for downlink communications and a second portion of the time slots within each frame are reserved for uplink communications.

7. A communications system according to claim 6, wherein a duration of the fixed time offset is the same for each active communications link.

8. A communications system according to claim 7, wherein each frame is of a duration T and includes a number, 2N, of time slots, each time slot being of a duration T/2N, and wherein the duration of the fixed time offset for each active communications link is T/2.

9. A communications system according to claim 6, wherein a downlink signal processing path and an uplink signal processing path of said first base station share common signal processing components.

10. A communications system according to claim 9, wherein said shared signal processing components include at least one of a filter, a local oscillator and a modem.

11. A method for conducting communications between base stations and mobile stations in a wireless communications system, comprising the steps of:

co-locating at least two base stations;

transmitting communications signals between the co-located base stations and the mobile stations using time division multiple access frames, each frame including a plurality of time slots, wherein downlink communications signals from the co-located base stations to the mobile stations are transmitted via a first carrier frequency and uplink communications signals from the mobile stations to the co-located base stations are transmitted via a second carrier frequency; and for each of the co-located base stations, reserving first and second partitions of time slots within each frame for downlink and uplink communications, respectively, such that, at any moment in time, at most one of the co-located base stations is transmitting via the first carrier frequency and at most one of the co-located base stations is receiving via the second carrier frequency.

12. A wireless communications system, comprising:

a plurality of mobile stations; and a first base station configured to transmit downlink communications signals to said mobile stations via a first carrier frequency and to receive uplink communications signals from said mobile stations via a second carrier frequency, the downlink and uplink communications signals being transmitted and received via successive time division multiple access frames, each frame including a plurality of time slots, wherein, for each active communications link between said first base station and a mobile station, a first time slot within each frame is allocated for downlink communications and a second time slot within each frame is allocated for uplink communications, the first and second allocated time slots being separated in time by a fixed time offset, and wherein a first partition of the time slots within each frame is reserved for downlink communications from said first base station to the mobile stations and a second partition of the time slots within each frame is reserved for uplink communications from the mobile stations to said first base station;

at least one additional base station co-located with said first base station and configured to transmit downlink communications signals to said mobile stations via the first carrier frequency and to receive uplink communications signals from said mobile stations via the second carrier frequency, the downlink and uplink communications signals of each of said additional base stations being transmitted and received via successive time division multiple access frames, each frame including a plurality of time slots, wherein, for each active communications link between an additional base station and a mobile station, a first time slot within each frame of said additional base station is allocated for downlink communications from said additional base station and a second time slot within each frame of said additional base station is allocated for uplink communications to said additional base station, the first and second allocated time slots being separated in time by a fixed time offset, wherein a first partition of the time slots within each frame of each additional base station is reserved for uplink communications and a second partition of the time slots within each frame of each additional base station is reserved for downlink communications, and wherein the first and second partitions of the frames of each of said base stations are structured such that, for each time slot in each frame, only one of said base stations is permitted to transmit on the first carrier frequency and only one of said base stations is permitted to receive on the second carrier frequency.

13. A communications system according to claim 12, wherein a first half of the time slots within each frame are reserved for downlink communications and a second half of the time slots within each frame are reserved for uplink communications.

14. A communications system according to claim 12, wherein, for N a positive integer and M a positive integer less than or equal to 2N, 2N being equally divisible by M, each frame includes 2N time slots, a first 2N/M of which time slots are reserved for downlink communications and a second 2N/M of which time slots are reserved for uplink communications.

15. A communications system according to claim 12, wherein a duration of the fixed time offset is the same for each active communications link.

16. A communications system according to claim 15, wherein each frame is of a duration T and includes a number, 2N, of time slots, each time slot being of a duration T/2N, and wherein the duration of the fixed time offset for each active communications link is T/2.

17. A communications system according to claim 12, wherein a downlink signal processing path and an uplink signal processing path of said first base station share common signal processing components.

18. A communications system according to claim 17, wherein said shared signal processing components include at least one of a filter, a local oscillator and a modem.

19. A communications system according to claim 12, wherein said first base station is co-located with a single additional base station, wherein first and second halves of the time slots of each frame of said first base station coincide in time with first and second halves, respectively, of each frame of said single additional base station, wherein the first and second halves of the time slots of each frame of said first base station are reserved, respectively, for downlink communications from said first base station and uplink communications to said base station, and wherein the first and second halves of the time slots of each frame of said single additional base station are reserved, respectively, for uplink communications to said single additional base station and downlink communications from said single additional base station.

* * * * *